J. ANDERES.
Hand Corn-Planter.

No. 227,197. Patented May 4, 1880.

WITNESSES:

INVENTOR:
J. Anderes
BY Munn & Co
ATTORNEYS.

UNITED STATES PATENT OFFICE.

JACOB ANDERES, OF PACIFIC, MISSOURI, ASSIGNOR TO HIMSELF AND SEBASTIAN NETSCHER, OF SAME PLACE.

HAND CORN-PLANTER.

SPECIFICATION forming part of Letters Patent No. 227,197, dated May 4, 1880.

Application filed February 13, 1880.

*To all whom it may concern:*

Be it known that I, JACOB ANDERES, of Pacific, in the county of Franklin and State of Missouri, have invented a new and useful Improvement in Hand Corn-Planters, of which the following is a specification.

Figure 1:
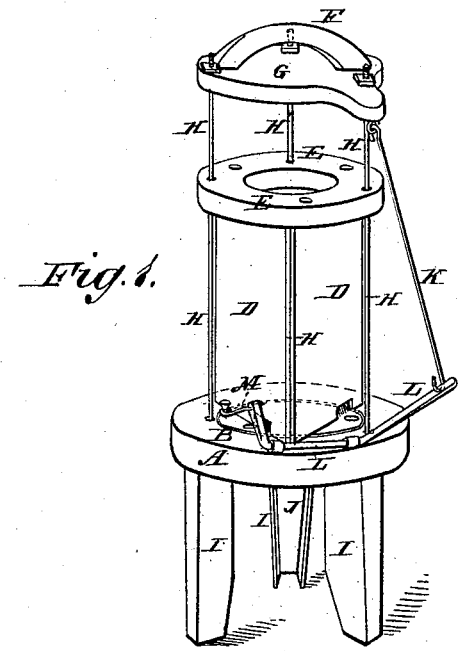
Figure 2:
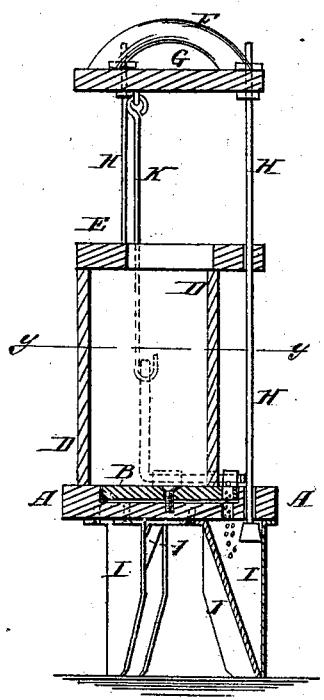
Figure 3:
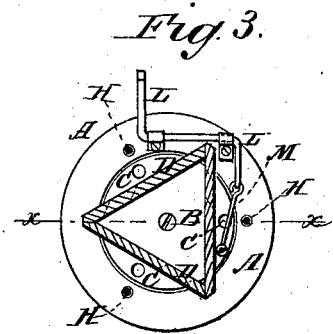

Figure 1 is a perspective view of the improvement. Fig. 2 is a sectional elevation taken through the line $x\ x$, Fig. 3. Fig. 3 is a sectional plan view taken through the line $y\ y$, Fig. 2.

The object of this invention is to furnish hand corn-planters simple in construction and convenient in use, which will plant the corn accurately, and will not be liable to become clogged or to get out of order.

The invention consists in constructing a hand seed-planter of a base-plate having spring-closed spouts attached to its lower side, a seed-box attached to its upper side and provided with discharge-holes, sliding rods having a handle-plate attached to their upper ends, and a seed-dropping mechanism, as will be hereinafter fully described.

Similar letters of reference indicate corresponding parts.

A represents the base-plate of the machine, in the middle part of which is formed a circular recess, into which is fitted a circular dropping-plate, B. The dropping-plate B is pivoted at its center to the plate A at the center of its recess.

In the dropping-plate B, near its edge, and at equal distances from each other and from its center, are formed holes C, to receive the seed and carry it to the dropping-holes through the plate A, through which it passes to the ground. To the base-plate A is attached the seed-box D, which is made of triangular form, or of other form that will allow the dropping-holes C to come to the outside of the box D when passing over the discharge-holes through the base-plate A, so that the operator can see if the machine is planting properly. To the top of the box D is attached a cover, E, which has a hole through its center, through which the seed is introduced.

F is the handle by means of which the planter is carried and operated, and which is attached to the plate G.

To the plate G are attached the upper ends of three (more or less) rods, H, which pass down through holes in the cover-plate E, along the sides of the box D, and through holes in the base-plate A, and have heads or collars attached to their lower ends.

To the lower side of the base-plate A, and around its discharge-openings, are attached the upper ends of the angular discharge-spouts I, the open sides of which are closed by the springs J. The upper ends of the springs J are attached to the plate A, and their lower ends fit into the cavities of the spouts I, so as to close the said spouts.

The rods H pass down through the base-plate A into the cavities of the spouts I, into such positions that when forced downward they will force back the springs J and allow the seed to drop to the ground. The spouts I and springs J, when the machine is forced downward, open holes in the ground to receive the seed.

To the handle-plate G is hinged the upper end of the rod K, the lower end of which is hinged to one end of the double crank L. The middle part or shaft of the double crank L works in bearings attached to the base-plate A.

To the other end of the double crank L is pivoted the end of a connecting-rod, M, the other end of which is pivoted to the pivoted dropping-plate B, so that the said plate may be operated to drop the seed by the downward movement of the handle-plate F G.

In using the planter it is placed upon the proper spot and pressed down with sufficient force to press the spouts I into the soil to the desired depth. At the same time the downward movement of the rods H presses back the springs J and allows the seed that may be in the spouts I to drop into the soil.

As the machine is raised the upward movement of the rods H allows the springs J to close and turns the seed-dropping plate B to again drop seed into the spouts I. As the machine is again pressed down upon the ground to drop the seed the seed-dropping plate B is turned back to bring the seed-dropping holes into the box D, to again receive seed.

Having thus fully described my invention, I claim as new and desire to secure by Letters Patent—

A hand corn-planter constructed substantially as herein shown and described, consisting of the plate A, having discharge-holes, the spouts I, springs J, the box D E, the sliding rods H, the handle-plate F G, and the seed-dropping mechanism K L M B, as set forth.

JACOB ANDERES.

Witnesses:
HENRY SCHALLER,
WILLIAM J. DUNN.